United States Patent [19]

Andrews

[11] Patent Number: 4,635,042

[45] Date of Patent: Jan. 6, 1987

[54] VACUUM LEAK DETECTOR

[75] Inventor: Donald R. Andrews, Mesquite, Tex.

[73] Assignee: Michael Ede, Plano, Tex.

[21] Appl. No.: 591,677

[22] Filed: Mar. 21, 1984

[51] Int. Cl.$^4$ ............................................. G08B 21/00
[52] U.S. Cl. ................................................... 340/605
[58] Field of Search .......................... 73/40.5 A, 592;
340/605; 367/135, 910

[56] References Cited

U.S. PATENT DOCUMENTS

| | | | |
|---|---|---|---|
| 3,222,635 | 12/1965 | Simpkins et al. | 367/135 X |
| 3,363,450 | 1/1968 | Simpkins et al. | 73/40.5 A |
| 3,500,676 | 3/1970 | Palmer | 73/40.5 A |
| 3,592,967 | 7/1971 | Harris | 73/40.5 A X |
| 3,620,070 | 11/1971 | Collins | 73/629 |
| 3,744,298 | 7/1973 | Flournoy et al. | 73/40.5 A |
| 4,172,379 | 10/1979 | Van Tilburg et al. | 73/40.5 A |
| 4,287,581 | 9/1981 | Neale, Sr. | 73/40.5 A X |
| 4,416,145 | 11/1983 | Goodman et al. | 73/40.5 A |
| 4,455,873 | 6/1984 | Alots | 73/629 |
| 4,457,163 | 7/1984 | Jackle | 73/40.5 A |

OTHER PUBLICATIONS

"Ultrasonic Leak Detection in Tanker Construction", Dawe Digest (Great Britain), vol. 14, No. 1, (May 1971).
"Ultrasonic Translator Air and Gas Leak Detector" Product Bulletin 118, model 118, Delcon Corp., May 1963.

Primary Examiner—James L. Rowland
Assistant Examiner—Brian R. Tumm
Attorney, Agent, or Firm—Pearne, Gordon, Sessions, McCoy, Granger & Tilberry

[57] ABSTRACT

A method and apparatus for detecting leaks within a vacuum system by narrow band detecting and amplifying a particular ultrasonic frequency peculiar to such leaks is disclosed. The device is formed as a hand held probe having a transducer and amplifier both peaked to the particular frequency sought along with a visible display and audible alarm for indicating the level or intensity of the particular frequency sought and audibly notifying the user when that sound level reaches some prescribed intensity. Appropriate shielding and filtering to prevent spurious actuation of the device are also disclosed.

5 Claims, 3 Drawing Figures

VACUUM LEAK DETECTOR

SUMMARY OF THE INVENTION

The present invention relates generally to sonic detecting devices and more particularly to hand held devices which may be moved about to locate the source of a sonic disturbance. In a preferred form, the device is frequency selective being tuned to respond only to a particular narrow band of sonic phenomenon beyond the normal audible range. When locating vacuum leaks, this narrow band may be centered at about 40,000 cycles per second.

There are a wide variety of known sonic detecting systems typically broad band in nature. Narrow band listening devices have also been employed, however, they are typically quite complex and designed for a quite specific and rather esoteric purpose such as submarine detection.

In recent years, the vacuum system associated with an internal combustion engine as, for example, found in conventional passenger automobiles has become quite complex and typically employs numerous flexible lines connected to the engine intake system for actuating a number of other devices such as windshield wipers, vehicle anti-pollution equipment, trunk lid release devices, power brakes and other vehicle accessories. A leak anywhere within such a vacuum system allows the engine to ingest additional fuel-free air and may be highly detrimental to engine performance. The current technique for locating such vacuum system leaks is to employ an aerosol can of ether or other combustible material frequently sold as engine starting fluid with that material being sprayed along the vacuum lines until an increase in engine rpm is detected indicating that the combustible spray is being sucked into the engine intake system at that point and thus that the aerosol material is being sprayed on a vacuum leak location. This present day system is somewhat hazardous since a highly combustible material is being somewhat haphazardly dispensed within the engine compartment and the process can also become relatively expensive when a large number of vehicle vacuum systems are being checked.

Among the several objects of the present invention may be noted the provision of a relatively simple and inexpensive narrow band sonic detecting device; the provision of a sonic detector sensitive to the particular frequency ranges associated with vacuum system leaks; the provision of a hand held probe for locating vacuum system leaks; the provision of an improvement in the process of detecting leaks in a vacuum system associated with an internal combustion engine; and the provision of a narrow band amplifier responsive to sonic phenomenon within its band to energize a visual indicator to provide information on the intensity of sounds within the amplifier band. These as well as other objects and advantageous features of the present invention will be in part apparent and in part pointed hereinafter.

In general, a device for locating sources of ultrasonic sound waves within a relatively narrow frequency band includes a transducer sensitive at least within that band, an amplifier having relatively high gain at least within that band and a display arrangement responsive to the amplifier output for providing a visible indication of the intensity of sounds sensed by the transducer within the band.

Also in general and in one form of the invention, leaks in a vacuum system are detected by sensing and amplifying ultrasonic frequencies indigenous to such vacuum leaks so as to reject other sounds and then providing an indication of the magnitude of ultrasound waves at the selected frequencies. Preferably an ultrasonic detector is moved around to various potential vacuum leak locations thus providing a high indication when the transducer is in the vacinity of such a leak.

Still further in general and in one form of the invention, a narrow band amplifier is employed to provide visual indications of the magnitude of signals sensed within a prescribed narrow frequency range. The amplifier includes a plurality of stages the last of which is a direct current amplifier for providing an output voltage level proportional to the magnitude of signals sensed while each of the predecessor stages is designed to have a significantly greater gain within the prescribed frequency range than at other frequencies. A rectifier circuit is provided at the input of the last or direct current stage. Frequency selective gain for the earlier stages is achieved by providing high pass input circuitry to each stage along with high pass negative feed back circuitry for each stage. Four such amplifier stages may be formed as part of one integrated circuit with that integrated circuit shieldably contained within the handle of a hand held sound sensing probe.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
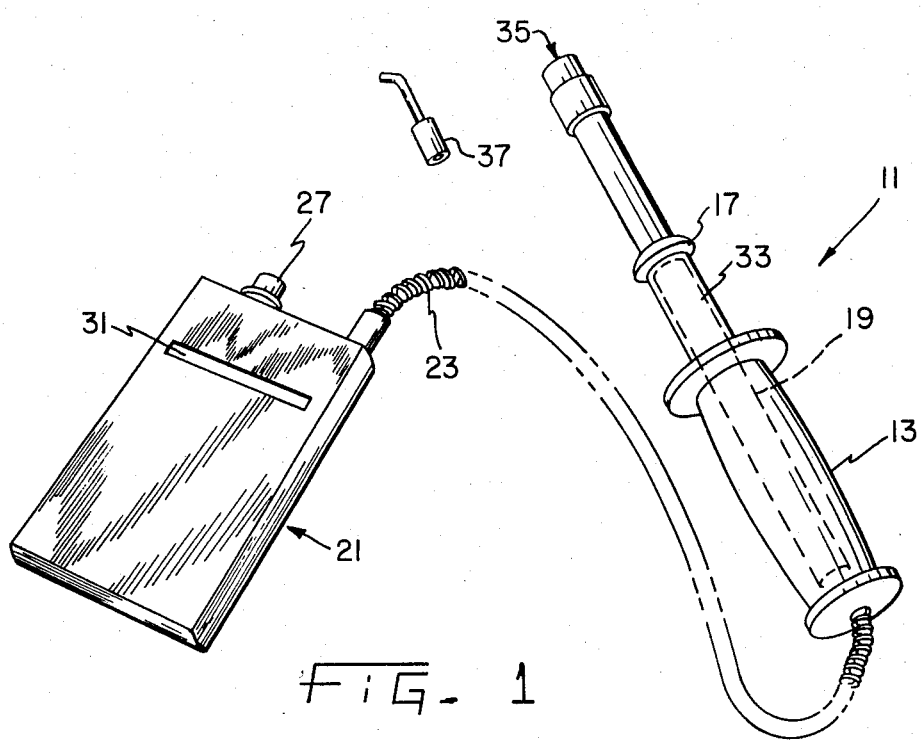
FIG. 1 is an illustration of the overall device for locating sources of ultrasonic sound waves.

Referring first to FIG. 1 the ultrasonic sound wave source locating device includes an elongated hand held probe 11 having a hand grip portion 13 near one end and supporting an ultrasonic transducer 15 within the probe in communication with an opening near the other end. Hand grip portion 13 includes a conductive shield 19 having one end near rim 17 which shield may be of copper or other electrical interference shielding material and within that shield 19 is located an integrated circuit chip having four amplifier stages along with supporting circuitry to be discussed in conjunction with FIG. 2. Probe 11 is connected to an indicator containing packet 21 by a self-coiling multiconductor cable 23. The packet 21 includes a battery 25 sensitivity control potentiometer 27, an audible alarm device such as a buzzer 29 as well as visual indicator 31 which may be in the form of a light emitting diode bar graph and its associated driver circuitry.

Probe 11 has a hand grip 13 made of rubber surrounding the copper shield 19 and includes a rubber tip 33 which slides over the exposed portion of copper shield 19 joining the two portions of the probe and resulting in a probe having essentially no conductive portions exposed. The open end 35 of the probe which normally receives sound waves may be made more selectively directional by inserting the ultrasound directing tip 37 into the opening 35. Thus with tip 37 in place the directional sensitivity of the device is enhanced allowing the user to direct the probe as desired to localize a particular ultrasound source.

Figure 2:
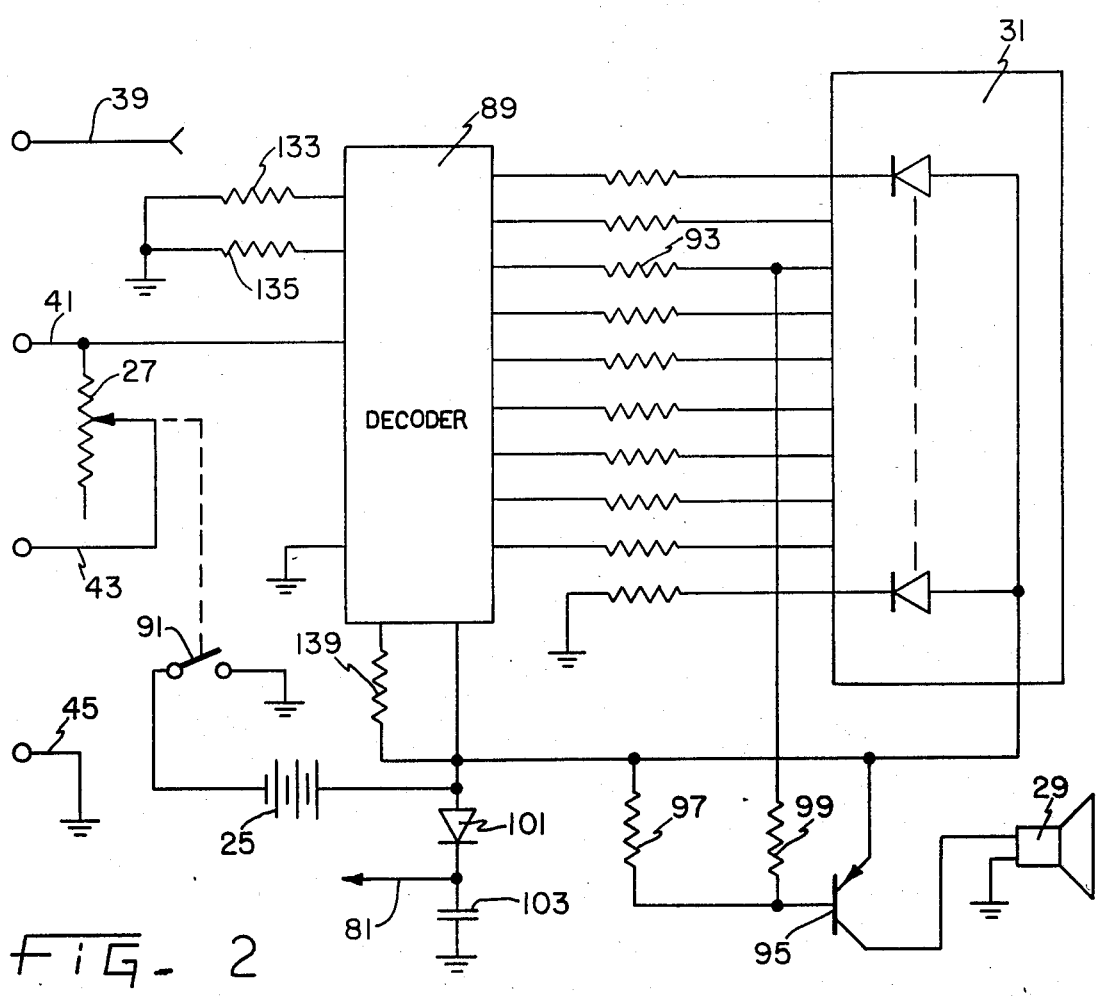
FIG. 2 is a schematic diagram of specific circuitry for implementing part of the device.
Figure 3:
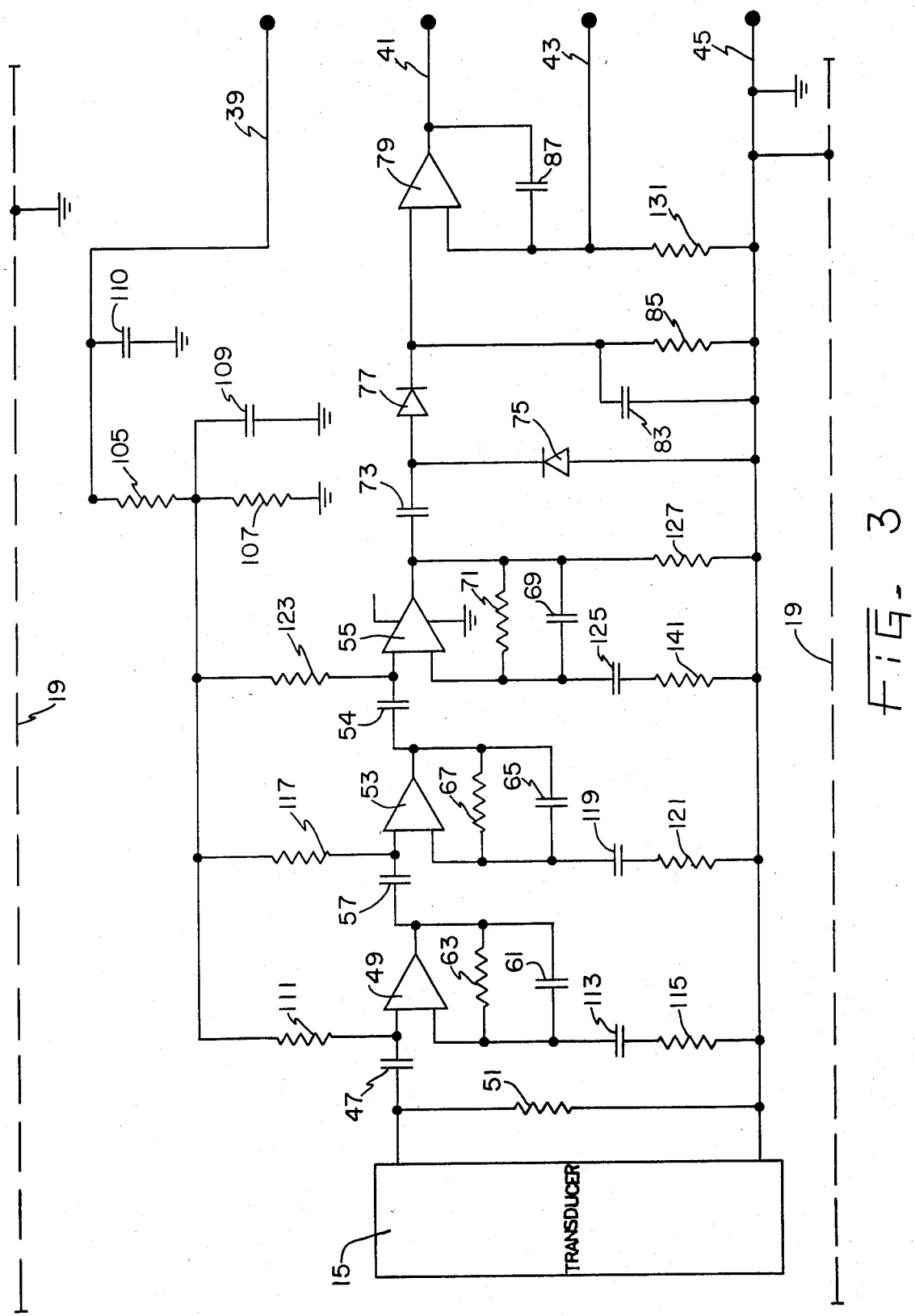
FIG. 3 is a schematic diagram of the remaining circuitry located within the device probe.

Referring now jointly to FIGS. 2 and 3, the coiled cord 23 contains the conductors 39, 41, 43 and 45 with the circuit components contained within packet 21 being generally indicated to the right of those conductors in FIG. 2 while those components contained within the probe 11 are generally indicated toward the left of those conductors in FIG. 3. Thus the probe 11 supports the transducer 15 which may, for example, be a Panasonic RKA-40 which happens to have relatively narrow band frequency response peaked at 3, 12 and 40 kilohertz. The transducer output is supplied by way of capacitor 47 to the positive input of amplifier stage 49 while the transducer output is shunted to ground by way of resistor 51. The combination of capacitor 47 and resistor 51 functions as a high pass filter coupling the transducer 15 to the amplifier stage 49. Amplifier 49 drives two further concatenated amplifier stages 53 and 55 with all three amplifier stages being similarly coupled having high frequency passing capacitors 57 and 54 respectively at their inputs. Each of these three amplifier stages has a second high pass filter circuit in the form of parallel connected resistor capacitor networks 61 and 63, 65 and 67, 69 and 71, respectively. Each of these high pass filter networks connects the output of its respective amplifier stage back to the negative input of that amplifier stage. This negative feed back arrangement diminishes the gain of the amplifier stage at frequencies above some prescribed level. Thus considering the three concatenated amplifier stages as an overall amplifier, the respective input capacitors such as 47 diminish the gain of that amplifier below some prescribed frequency such as 40 kilohertz while the negative feed back circuits 61 and 63, for example, diminish the gain of that amplifier above some prescribed frequency level such as 40 kilohertz with the overall result of these two different types of filtering being a narrow band pass amplifier having a high gain only in a narrow band centered approximately about 40 kilohertz and having a bandwidth, for example, of about 2 KHZ. Since this high gain narrow band is matched to a high sensitivity narrow band of the transducer 15, the output of amplifier stage 55 which is passed through yet another high pass filter in the form of capacitor 73 is a highly amplified version of those sounds closely centered about the 40 kilohertz center frequence which are incident on the transducer 15. This ultrasonic frequency is next rectified by diodes 75 and 77 and passed through a direct current amplifier stage 79 so that the voltage appearing on line 41 is essentially a direct current voltage level reflecting the magnitude of incident sounds on transducer 15 within the prescribed narrow band. Of course, the rectified signal passing through diode 77 may be smoothed by a further filter represented by the parallel combination of capacitor 83 and resistor 85 before being direct current amplified by amplifier stage 79. Further smoothing and particularly elimination of any radio frequency interference that might sneak into the system despite the presence of the shield 19 may be eliminated by negative feed back capacitor 87.

The circuitry within plastic box of packet 21 is illustrated in FIG. 2 and includes a multisegment light emitting diode bar graph 31 which is operator visible as seen in FIG. 1 and which comprises a linear array of segments which may be sequentially energized under the control of the driver or decoder unit 89. This bar graph 31 and decoder 89 are commercially available units manufactured under the designation TA612 by AND, INC. This bar graph provides a qualitative indication of sound intensity as opposed to a quantitative indication as might be achieved with a meter or digital readout. Also contained within the packet 21 are the battery 25 and audible alarm or buzzer 29 along with a sensitivity adjustment potentiometer 27 having a conventional on/off switch 91 ganged thereto. Buzzer 29 is driven by transistor 95 the base of which is resistively coupled to resistor 93 so that transistor 95 is normally biased to its off condition by way of resistor 97, however, when the decoder 89 supplies an output signal to energize, for example, the eighth of ten bars on graph 31, a signal is also supplied by way of resistor 99 turning transistor 95 on and sounding the audible alarm 29.

The voltage from battery 25 is, of course, supplied to the driver or decoder 89 as well as transistor 95 and buzzer 29 by somewhat conventional resistive connections as illustrated and also that battery voltage is supplied by way of line 81 connected to line 39 and to the amplifier circuitry within the probe 11. Diode 101 and capacitor 103 are present to ensure that no spurious radiation which might be incident on the packet 21 is transferred back through coiled cord 23 into the amplifier circuitry. Thus the coiled cord 23 includes a ground lead 45 connected to the copper shield 19 and the ground circuitry within packet 21 along with a battery supply line 39 connected by way of a voltage divider circuit comprising resistors 105 and 107 and further spurious radiation filtering capacitors 109 and 110 to then be conventionally connected to the several amplifier stages. The coiled cable 23 also includes the voltage level output line 41 and a sensitivity control feed back line 43. Thus sensitivity control 27 actually varies the gain of the direct current amplifier stage 79.

As mentioned earlier, the several amplifier stages 49, 53, 55 and 79 may comprise a single integrated circuit chip, for example, type CA324 or GC324 manufactured by NEC with that chip enclosed within the copper shield shield 19 to prevent the introduction of spurious radiation into the system. With this arrangement, the probe 11 may be used to scan an engine compartment for the characteristic about 40,000 cycle per second ultrasounds associated with vacuum leaks and, when such a leak is first detected, the sensitivity of the system may be changed and the probe perhaps with the directional tip 37 in place used to further trace that sound down to the exact location of the leak making maintenance of such vacuum systems far more easy and safe than was heretofore possible. The gain of the first three stages of this amplifier at the frequency to which the stages are peaked will be around 3,000 while sounds outside this narrow band frequencies are essentially undetectible. Component values in this specific embodiment are listed in the following table.

| REFERENCE NUMERAL | DESCRIPTION |
| --- | --- |
| 51, 63, 105, 111, 123, 117, 107 | 220K ohm |
| 47, 57, 113, 119, 54 | 470 Pfd |
| 61, 65, 69, 125 | 12 Pfd |
| 121, 127, 135, 99 | 10K Ohm |
| 67, 71 | 470K ohm |
| 73, 87, 125 | .047 Mfd |

-continued

| REFERENCE NUMERAL | DESCRIPTION |
|---|---|
| 109, 110, 83 | 1.0 Mfd |
| 75, 77, 101 | IN4148 Diode |
| 139 | 22K ohm |
| 131, 141, 115 | 4.7K ohm |
| 113, 93, etc. | 1.1K ohm |
| 27, 97, 85 | 100K ohm |
| 25 | 9 Volt Battery |
| 103 | 100 Mfd |

From the foregoing it is now apparent that a novel device for locating the source of ultrasonic sound waves, for example, as emitted by a vacuum leak within an internal combusion engine environment as well as a novel method for locating the source of such ultrasonic sound waves have been disclosed meeting the objects and advantageous features set out herein before as well as others and that modifications as to the precise configurations, shapes and details may be made by those having ordinary skill in the art without departing from the spirit of the invention or the scope thereof as set out by the claims which follow.

What is claimed is:

1. A device for locating sources of ultrasonic sound waves within a relatively narrow frequency band indigenous to vacuum leaks, comprising:
    a hand held probe;
    a frequency sensitive ultrasonic transducer supported within the probe for providing an electrical output in response to incident ultrasound waves, and having a greater sensitivity to ultrasound waves within said narrow band than to at least certain other frequencies, the transducer exhibiting a sensitivity peak within the narrow band at about 40 kilohertz and at least one other sensitivity peak outside the narrow band;
    frequency selective means coupled to the transducer and located within the probe for amplifying the transducer electrical output, said amplifying means exhibiting a greater gain to electrical signals having frequencies within the narrow band than to at least certain other frequencies, the amplifying means comprising a series of concatenated amplifier stages, each having a low frequency blocking alternating current input circuit and a high frequency passing negative feedback circuit for reducing amplifier gain at higher frequencies, the two circuits jointly effective to endow the amplifying means with relatively narrow band pass characteristics, a half-wave rectifier circuit connected to the output of the last of the concatenated stages and a direct current amplifier for providing an output voltage level proportional to the magnitude of the half-wave rectifier output;
    an electrically conductive shield within the probe surrounding the amplifying means; and
    an indicator containing packet comprising display means coupled to the amplifying means and located remotely from the probe for providing a visible qualitative indication of the intensity of the ultrasound waves within the narrow band incident the transducer, the display means comprising a multisegment bar graph connected to the direct current amplifier; the indicator containing packet adapted to also contain a battery, operator actuable sensitivity control means for selectively varying the gain of the direct current amplifier, and an audible alarm device a threshold circuit coupling the audible alarm device to the direct current amplifier and to the display means for sounding the alarm device when the output voltage level exceeds a preselected level as indicated by one of the segments of the bar graph.

2. The device of claim 1, wherein the device further comprising a self coiling multiconductor cable interconnecting the probe and packet.

3. The device of claim 1 wherein the bar graph comprises a multisegment light emitting diode bar graph.

4. The device of claim 1, wherein the hand held probe is elongated having a hand grip portion near one end.

5. The device of claim 1 further comprising an ultrasound directing tip adapted to be selectively attached to the probe opposite end to enhance the directional sensitivity of the device.

* * * * *